United States Patent
Bodley

(10) Patent No.: US 11,247,408 B2
(45) Date of Patent: Feb. 15, 2022

(54) COMPOSITE THERMOPLASTIC LINER

(71) Applicant: MTI GROUP PTY LTD, Western Australia (AU)

(72) Inventor: Nicholas Bodley, Western Australia (AU)

(73) Assignee: MTI GROUP PTY LTD, Wangara (AU)

(*) Notice: Subject to any disclaimer, the term of this patent is extended or adjusted under 35 U.S.C. 154(b) by 188 days.

(21) Appl. No.: 16/303,114

(22) PCT Filed: Nov. 30, 2016

(86) PCT No.: PCT/AU2016/051176
§ 371 (c)(1),
(2) Date: Nov. 19, 2018

(87) PCT Pub. No.: WO2017/197426
PCT Pub. Date: Nov. 23, 2017

(65) Prior Publication Data
US 2020/0180236 A1      Jun. 11, 2020

(30) Foreign Application Priority Data
May 18, 2016   (AU) ................................ 2016901855

(51) Int. Cl.
*B29C 65/00*        (2006.01)
*B29C 65/02*        (2006.01)
(Continued)

(52) U.S. Cl.
CPC .......... *B29C 66/71* (2013.01); *B29C 66/1122* (2013.01); *B29C 65/02* (2013.01);
(Continued)

(58) Field of Classification Search
CPC ..... B29C 66/71; B29C 66/1122; B29C 66/43; B29C 66/7212; B29C 66/723; B29C 66/73921
See application file for complete search history.

(56) References Cited

U.S. PATENT DOCUMENTS 4,250,811 A   2/1981   Mackey
4,274,896 A   6/1981   Bosse
(Continued)

FOREIGN PATENT DOCUMENTS

EP      0283201 A2    9/1988
EP      1304301 A1    4/2003
(Continued)

OTHER PUBLICATIONS

International Search Report, dated Feb. 10, 2017 for corresponding International Application No. PCT/AU2016/051176.
(Continued)

*Primary Examiner* — Derek J Battisti
(74) *Attorney, Agent, or Firm* — Intellectual Property Law Group LLP

(57) ABSTRACT

A composite thermoplastic liner for use as a moisture barrier comprises a hollow tubular body made from a woven composite thermoplastic material configured to substantially block the ingress of moisture; and an opening at one end of the hollow tubular body for intake into the hollow of the hollow tubular body. In one aspect a welded closed opposite end forms a base configured to substantially block the ingress of moisture external to the hollow tubular body. In another aspect the woven composite thermoplastic material comprises an electrically conductive additive. In another aspect there is a gusset in at least one side of the hollow tubular body. The hollow tubular body is able to be flattened with the respective gussets formed from folds of the hollow tubular body, such that in the flattened state the tube is more
(Continued)

readily stored in a narrow form, but is expandable when the gusset is unfolded.

20 Claims, 2 Drawing Sheets

(51) Int. Cl.
   *B29K 101/12* (2006.01)
   *B65D 30/20* (2006.01)

(52) U.S. Cl.
   CPC ............ *B29C 66/43* (2013.01); *B29C 66/723* (2013.01); *B29C 66/7212* (2013.01); *B29C 66/73921* (2013.01); *B29K 2101/12* (2013.01); *B65D 31/10* (2013.01); *B65D 2213/02* (2013.01)

(56) References Cited

U.S. PATENT DOCUMENTS

| | | | | |
|---|---|---|---|---|
| 5,458,419 A | * | 10/1995 | Trepte | B65D 88/165 383/117 |
| 5,845,995 A | | 12/1998 | Huemer | |
| 6,179,467 B1 | * | 1/2001 | Derby | B29C 66/61 383/113 |
| 7,560,274 B1 | * | 7/2009 | Fuller | C12M 23/24 383/102 |
| 2003/0031388 A1 | * | 2/2003 | Gipson | B32B 5/022 383/64 |
| 2006/0078234 A1 | | 4/2006 | Chandra et al. | |
| 2007/0082158 A1 | | 4/2007 | Nowak | |
| 2010/0209024 A1 | | 8/2010 | Fuerst et al. | |
| 2010/0270309 A1 | | 10/2010 | Files et al. | |
| 2015/0078684 A1 | * | 3/2015 | Koesters | B65D 31/10 383/103 |

FOREIGN PATENT DOCUMENTS

| | | |
|---|---|---|
| EP | 1714567 A2 | 10/2006 |
| GB | 1045590 A | 10/1966 |
| GB | 1377384 A | 12/1974 |
| JP | H 02143830 A | 6/1990 |
| WO | WO 2012/052445 A1 | 4/2012 |

OTHER PUBLICATIONS

Written Opinion of the ISA, dated Feb. 10, 2017 for corresponding International Application No. PCT/AU2016/051176.

International Preliminary Report on Patentability completion date Jul. 11, 2018 for corresponding International Application No. PCT/AU2016/051176.

\* cited by examiner

COMPOSITE THERMOPLASTIC LINER

CROSS-REFERENCE TO RELATED APPLICATIONS

This application is a U.S. National Phase application, under 35 U.S.C. § 371, of International Application No. PCT/AU2016/051176, with an international filing date of Nov. 30, 2016, and claims benefit of Australian Application No. 2016901855 filed on May 18, 2016, which is hereby incorporated by reference for all purposes.

FIELD OF THE INVENTION

The present invention relates to a composite thermoplastic liner, including but not limited to a liner for use as a moisture barrier.

BACKGROUND

Polymer liners are known to be used in the packaging industry for protecting moisture sensitive materials, such as washing powders, cements and rice. The liners are used as moisture barriers to prevent or block the ingress of moisture external to the liner from interacting with their contents.

The polymer liners are typically in the form of a woven tube. The tube is fabricated by first forming a parent material by weaving thin polymer strands in the vertical and horizontal weave plain, and laminating a thin polymer laminate either as an inner material and/or the outer material. Typically, the polymer strands are polypropylene and the polymer laminate are polyethylene/Biaxial oriented polypropylene (BOPP). It is generally recognised by industry that liners need to be sealed at the base to prevent any water ingress. As such, the openings of the tube are typically closed by the use of stitching or adhesives. However, these methods do not produce a water tight seal and would not enable the polymer liner to be suitable for submergence in water.

In specialist applications wherein the liner is exposed to high levels of moisture, for example a blast hole liner, it is necessary to use another method of closing the tube. Welding the opening of the polymer liner closed is an alternate method for producing a water tight seal. However, with welding the polymer liner, a number of disadvantages are produced which makes the method unviable for use. At the welding area, the joint will have very little mechanical strength as the polymer laminate is extremely thin and the parent woven material will not bond sufficiently to the laminate, due to the differences in polymer groups and the differences in melting points.

Any references to documents that are made in this specification are not intended to be an admission that the information contained in those documents form part of the common general knowledge known to a person skilled in the field of the invention, unless explicitly stated as such.

SUMMARY OF THE INVENTION

According to an aspect of the invention, there is provided a composite thermoplastic liner for use as a moisture barrier, comprising:
a hollow tubular body made from a woven composite thermoplastic material configured to substantially block the ingress of moisture;
an opening at one end of the hollow tubular body for intake into the hollow of the hollow tubular body; and
a welded closed opposite end to form a base configured to substantially block the ingress of moisture external to the hollow tubular body.

In an embodiment of the invention, the woven composite thermoplastic material is comprised of a parent material and at least one laminate material.

In an embodiment of the invention, the at least one laminate material is configured to be an internal laminate or an external laminate.

In an embodiment of the invention, the parent material is comprised of at least two polymer components.

In an embodiment of the invention, one of the at least two polymer components is configured as a plurality of strands in the vertical direction and the other of the at least two polymer components is configured as a plurality of strands in the horizontal direction.

In an embodiment of the invention, the at least one laminate material is comprised of the same thermoplastic material as one of the polymer components of the parent material.

In an embodiment of the invention, the at least one laminate material is comprised of the same thermoplastic material as the one of the polymer components of the parent material that is configured as a plurality of strands in the horizontal direction.

In an embodiment of the invention, the hollow body is configured in a gusseted format.

In an embodiment the at least two polymer components have at least two different melting points.

In an embodiment, the composite thermoplastic material comprises electrically conductive additives.

In an embodiment the parent material comprises electrically conductive additives.

In an embodiment the laminate material comprises electrically conductive additives.

In an embodiment the electrically conductive material grounds the composite thermoplastic liner so as to prevent creation of a static charge.

In an embodiment the composite thermoplastic material comprises electrically conductive thread woven through the composite thermoplastic material.

According to a second aspect of the invention, there is provided a method of producing a composite thermoplastic liner for use as a moisture barrier, comprising:
manufacturing a woven composite thermoplastic material configured to substantially block the ingress of moisture;
producing a hollow body having at least two openings within the woven composite thermoplastic material;
creating a base on the hollow body by welding closed one of the at least two openings.

In an embodiment of the invention, the manufacturing of the woven composite thermoplastic material is comprised of weaving a plurality of strands running in a vertical direction and a plurality of strands running in a horizontal direction to form a parent material.

In an embodiment of the invention, the manufacturing of the woven composite thermoplastic material further comprises laminating an internal laminate material or an external laminate material to the parent material.

In an embodiment of the invention, the manufacturing of the woven composite thermoplastic material further comprises laminating an internal laminate material and an external laminate material to the parent material.

According to an aspect of the invention, there is provided a composite thermoplastic liner for use as a moisture barrier, comprising:

a hollow tubular body made from a woven composite thermoplastic material configured to substantially block the ingress of moisture, and comprising an electrically conductive additive;

an opening at one end of the hollow tubular body for intake into the hollow of the hollow tubular body.

In an embodiment the composite thermoplastic material comprises electrically conductive additive formed in one or more thermoplastics of the composite thermoplastic material. In an embodiment the electrically conductive additive comprises a powdered conductor.

In an embodiment the electrically conductive additive comprises an electrically conductive thread woven through the composite thermoplastic material.

According to an aspect of the invention, there is provided a composite thermoplastic liner for use as a moisture barrier, comprising:

a hollow tubular body made from a woven composite thermoplastic material configured to substantially block the ingress of moisture;

a gusset in at least one side of the hollow tubular body such that the hollow tubular body is able to be flattened with the respective gussets formed from folds of the hollow tubular body, such that in the flattened state the tube is more readily stored in a narrow form, but is expandable when the gusset is unfolded.

As used herein, the term "composite thermoplastic material" is to be understood to mean a thermoplastic material that includes discrete portions of different polymers. The different polymers are not blended in the material and substantially retain their own physical and chemical properties (i.e. a polymer blend is not formed to any significant degree). In some embodiments, the composite thermoplastic materials may comprise woven strands (e.g. threads or filaments) of discrete polymer components, woven into substantially planar sheets, for example. In some embodiments, the composite thermoplastic materials may comprise (or further comprise) an internal and/or external laminate layer (e.g. to improve the durability or waterproofing of the material). Such a laminate layer may, for example, be made from a different polymer than that of those used to form the remainder of the composite thermoplastic material.

In this specification the terms "comprising" or "comprises" are used inclusively and not exclusively or exhaustively.

BRIEF DESCRIPTION OF THE DRAWINGS

In order to provide a better understanding, embodiments of the present invention will be described, by way of example only, with reference to the accompanying drawings, in which.

DETAILED DESCRIPTION

The present invention provides a composite thermoplastic liner and method for making the same. The liner comprises a woven composite thermoplastic material configured to substantially block the ingress of moisture, where the woven composite thermoplastic material is formed into a hollow tubular body. The hollow tubular body has an opening at one end of the hollow tubular body for intake into the hollow of the hollow tubular body. Another opposite end is welded closed to form a base configured to substantially block the ingress of moisture external to the hollow tubular body.

Figure 1:
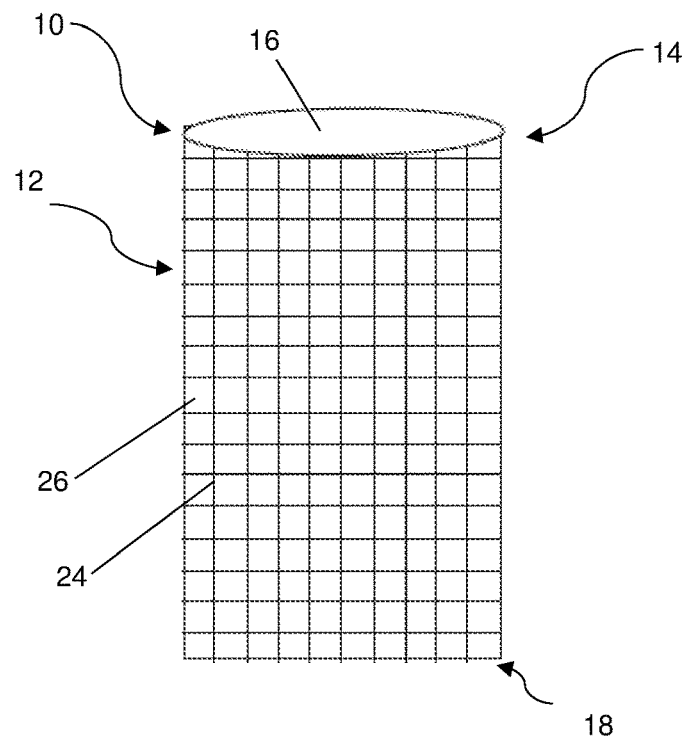
FIG. 1 is a perspective view of a composite thermoplastic liner.

FIG. 1 illustrates a composite thermoplastic liner 10 for use as a moisture barrier according to an initial embodiment of the invention. The liner 10 comprises a woven thermoplastic material 12 configured to substantially block the ingress of moisture through its bulk. The woven material 12 is typically formed as a hollow body 14, typically with a pair of openings 16, 18. In this example, the hollow body 14 is in the shape of a tubular roll, however it would be appreciated by those skilled in the art that the hollow body 14 may be of any suitable shape.

Figure 2:
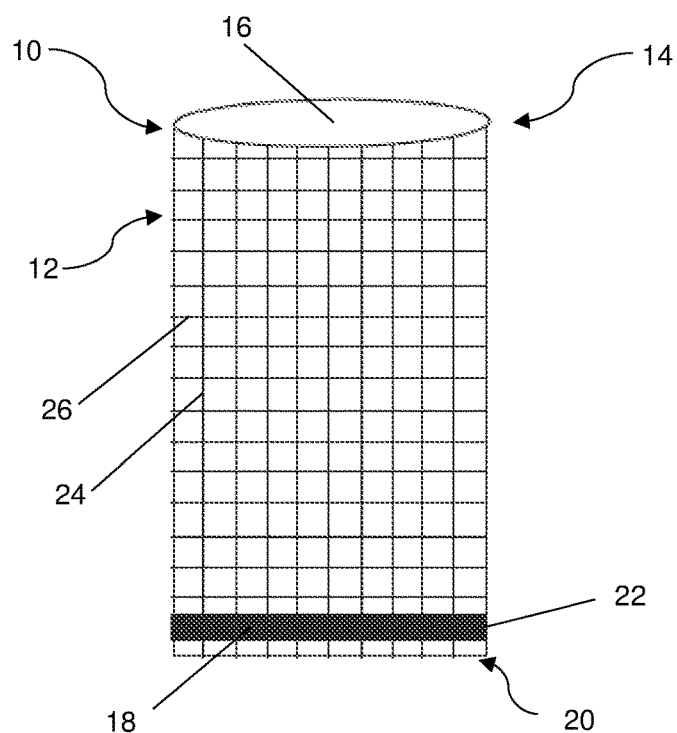
FIG. 2 is a perspective view of the composite thermoplastic liner with an end welded closed.

FIG. 2 illustrates the composite thermoplastic liner 10 according to a final embodiment of the invention. The hollow body 14 is made water proof by sealing the opening 18 to form a base 20 configured to substantially block the ingress of moisture into the hollow body 14. The method of sealing the opening 18 is by welding a designated weld area 22, which is located next to the opening 18. This ensures that the base 20 becomes a barrier, created by the weld, between the exterior of the liner 10 and the interior and contents of the liner 10.

The woven material 12 is comprised of a parent material and at least one laminate material.

The parent material is formed by the weaving of a plurality of strands running in the vertical direction, known as warp strands 24, with a plurality of strands running in the horizontal direction, known as weft strands 26. The parent material is further comprised of two polymer components, with one polymer component being associated to the warp strands 24 and the other polymer component being associated to the weft strands 26. In this example, the warp strands 24 are made from polyethylene while the weft strands 26 are made from polypropylene. The composite nature of the parent materials provides advantages over a woven material 12 that is made from a single polymer material. The main advantages provided by the composite weave include the retention of strong physical properties acquired by the use of polypropylene and the retention of mechanical strength at the weld area 22 acquired by the use of polyethylene. The polypropylene weft strands 26 provide the parent material the physical properties of minimal stretch, excellent abrasion resistance and improved environmental factors. The polyethylene warp strands 24 enable the parent material to strongly bind to the at least one laminate material, whether it is in the form of an internal or external laminate.

The laminate material is a thin material that is used as an internal material or an external material for providing waterproofing attributes. When the laminate material is used as the internal material, it acts as an inner wall of the liner 10. When the laminate material is used as an external material, it acts as an external wall of the liner 10. The laminate material acts as a further continuous physical barrier to block the ingress of moisture external to the liner 10. The laminate material is comprised of a polymer component that is the same as one of the polymer components found in the parent material. In this example, the polymer component of the laminate material is polyethylene. However, it would be appreciated by those skilled in the art that more than one laminate material may be used, so as to provide a reinforced inner or external material, or a woven material 12 that has both the internal material and the external material.

The weld at the weld area 22 is used to seal the base of the liner 10 to prevent moisture ingress into the interior of the liner 10. In this example, the weld is conducted with an apparatus that receives and clamps the weld area 22 before subjecting the woven material 12 to a plurality of heating cycles. This type of welding has unexpectedly been found to enable polymers of different melting points to be welded together.

The advantage provided by the combination of the parent material and the laminate material is further demonstrated during the welding process. As the parent material contains a polymer component that is the same as that of the laminate material, the act of welding will enable the lamination to bind better to the parent material as heat transfer is improved and the heated polymer components flow better. This ensures that the parent material and laminate material bind together with greater mechanical strength, resulting in the barrier created by the weld between the exterior and interior of the liner 10 being superior.

Figure 3:
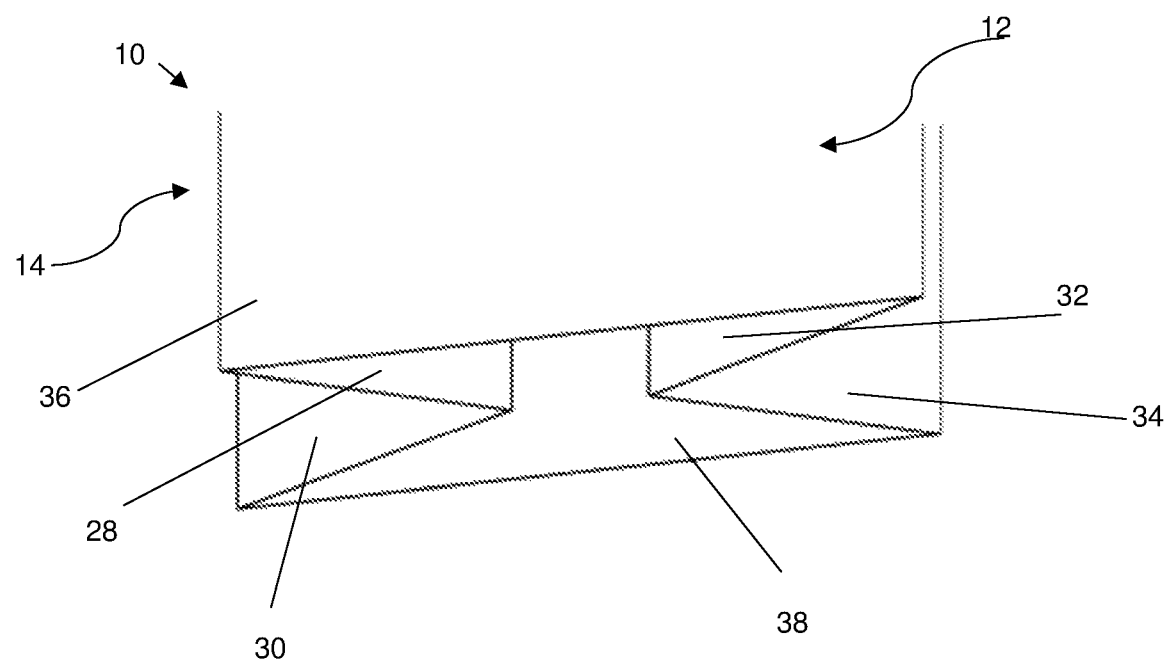
FIG. 3 is a perspective view of the composite liner in a gusseted format.

In a preferred embodiment, the hollow body 14 is configured in a gusseted format as illustrated by FIG. 3. The gusseted format results in the hollow body 14 having four layers 28, 30, 32, 34 to be sealed on the edges and two layers in the middle 36, 38.

The method of producing the liner 10 will now be described in more detail.

The production of the composite thermoplastic liner 10 for use as a moisture barrier involves initially manufacturing a woven composite thermoplastic material 12. The woven material 12 is configured to substantially block the ingress of moisture due to its construction containing a parent material and a laminate material. The process of manufacturing the woven material 12 comprises weaving a plurality of strands running in a vertical direction and a plurality of strands running in a horizontal direction to form a parent material. Additionally, the woven material 12 contains a laminate material that is laminated to the parent material either as an internal laminate material or an external laminate material. However, it would be appreciated by those skilled in the art that more than one laminate material may be laminated to the parent material so that there is an internal laminate material and an external laminate material. A hollow body 14 is then produced using the woven material 12, so that the hollow body has two openings 16, 18. A base 20 is created on the hollow body 14 by welding closed one of the two openings by using pulsed application of heat to the weld area.

Figure 4:
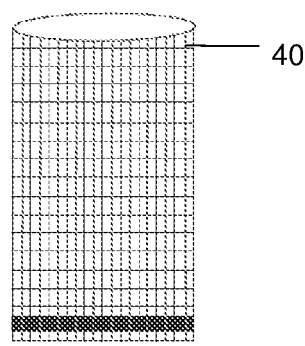
FIG. 4 is a perspective view of the composite thermoplastic liner having conductive material within.

Referring to FIG. 4, there is shown a welded composite thermoplastic liner 10 having electrically conductive additives 40 within the parent or laminate material. The electrically conductive additives can include carbon or metal among others, and can be in the form of thread or yarn.

Figure 5:
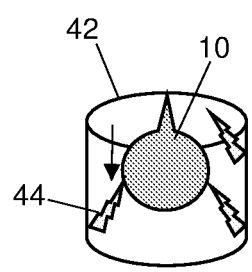
FIG. 5 is a perspective view of a composite thermoplastic liner being inserted into a blast hole, with static electricity being created.
Figure 6:
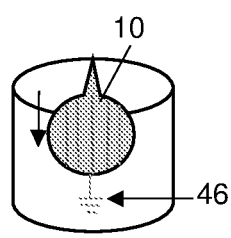
FIG. 6 is a perspective view of the composite thermoplastic liner of FIG. 4 being inserted into a blast hole, and then grounded by the conductive material of the liner.

Referring to FIG. 5, there is shown a welded closed composite thermoplastic liner 10 being inserted into a blast hole 42 and generating static electricity 44. This often occurs when the liner is inserted into a blast hole 42. In order to overcome this problem, conductive additives are inserted into the material of the liner within either the parent or the laminate material, as shown in FIG. 4. The welded closed composite thermoplastic liner of FIG. 4 is then inserted into the blast hole 42 of FIG. 6, and as shown, the composite thermoplastic liner is grounded 46 by the presence of the conductive additives and static electrical charges do not accumulate.

Modifications may be made to the present invention within the context of that described and shown in the drawings. Such modifications are intended to form part of the invention described in this specification.

The invention claimed is:

1. A composite thermoplastic liner for use as a moisture barrier in a borehole, comprising: a hollow tubular body made from woven composite thermoplastic materials, the woven composite thermoplastic materials comprising at least two different melting points and different tensile strengths, and configured to substantially block the ingress of moisture; an opening at one end of the hollow tubular body for intake into the hollow of the hollow tubular body; and a welded closed opposite end to form a base configured to substantially block the ingress of moisture external to the hollow tubular body; wherein the woven composite thermoplastic material is comprised of a parent woven composite material and further comprises at least one laminate material on the parent woven composite material, wherein the parent material is comprised of at least two polymer components, and wherein one of the at least two polymer components is comprised of a plurality of strands in the vertical direction and the other of the at least two polymer components is comprised of a plurality of strands in the horizontal direction.

2. A composite thermoplastic liner according to claim 1, wherein the at least one laminate material is configured to be an internal laminate or an external laminate.

3. A composite thermoplastic liner according to claim 1, wherein the at least one laminate material is comprised of the same thermoplastic material as one of the polymer components of the parent material that is configured as a plurality of strands parallel to the length of the liner.

4. A composite thermoplastic liner according to claim 1, wherein the at least one laminate material is comprised of the same thermoplastic material as the one of the polymer components of the parent material that is configured as a plurality of strands transverse to the length of the liner.

5. A composite thermoplastic liner according to claim 1, wherein the hollow body is configured in a gusseted format.

6. A composite thermoplastic liner according to claim 1, wherein the at least two polymer components have at least two different melting points.

7. A composite thermoplastic liner according to claim 1, wherein the woven composite thermoplastic material comprises electrically conductive additives in the plurality of strands parallel to the length of the liner.

8. A composite thermoplastic liner according to claim 1, wherein the parent material comprises electrically conductive additives.

9. A composite thermoplastic liner according to claim 1, wherein the laminate material comprises electrically conductive additives.

10. A composite thermoplastic liner according to claim 7, wherein the electrically conductive material grounds the composite thermoplastic liner so as to prevent creation of a static charge.

11. A composite thermoplastic liner according to claim 1, wherein the composite thermoplastic material comprises electrically conductive thread woven through the composite thermoplastic material.

12. A method of producing a composite thermoplastic liner for use as a moisture barrier in a borehole, comprising: manufacturing woven composite thermoplastic materials, the woven composite thermoplastic materials comprising at least two different melting points and different tensile strengths, and configured to substantially block the ingress of moisture, wherein the woven composite thermoplastic material is comprised of a parent woven composite material and further comprises at least one laminate material on the parent woven composite material, wherein the parent material is comprised of at least two thermoplastics, and wherein one of the at least two thermoplastics is comprised of a plurality of strands in the vertical direction and a different one of the at least two thermoplastics is comprised of a plurality of strands in the horizontal direction; producing a hollow body having at least two openings within the woven composite thermoplastic material; creating a base on the hollow body by welding closed one of the at least two openings.

13. A method of producing a composite thermoplastic liner according to claim 12, wherein the manufacturing of the woven composite thermoplastic material is comprised of weaving the plurality of strands of the one of the at least two thermoplastics having a first melting point and tensile strength running in the vertical direction and the plurality of strands of the different one of the at least two thermoplastics having a different melting point and tensile strength running in the horizontal direction to form the parent material.

14. A method of producing a composite thermoplastic liner according to claim 13, wherein the manufacturing of the woven composite thermoplastic material further comprises laminating an internal laminate material and/or an external laminate material to the parent material.

15. A method of producing a composite thermoplastic liner according to claim 14, wherein the at least one laminate material is comprised of the same thermoplastic material as the one of the at least two thermoplastic materials of the parent material.

16. A composite thermoplastic liner for use as a moisture barrier in a bore-hole, comprising: a hollow tubular body made from a woven composite thermoplastic material configured to substantially block the ingress of moisture from the borehole, and comprising an electrically conductive additive; an opening at one end of the hollow tubular body for intake into the hollow of the hollow tubular body when the hollow tubular body in in a borehole; wherein the woven composite thermoplastic material is comprised of a parent woven composite material and further comprises at least one laminate material on the parent woven composite material, wherein the parent material is comprised of at least two thermoplastics, and wherein one of the at least two thermoplastics is comprised of a plurality of strands in the vertical direction and the other of the at least two thermoplastics is comprised of a plurality of strands in the horizontal direction.

17. A composite thermoplastic liner according to claim 16, wherein the composite thermoplastic material comprises electrically conductive additive formed in one or more thermoplastics of the composite thermoplastic material.

18. A composite thermoplastic liner according to claim 17, wherein the electrically conductive additive comprises a powdered conductor.

19. A composite thermoplastic liner according to claim 16, wherein the electrically conductive additive comprises an electrically conductive thread woven through the composite thermoplastic material.

20. A composite thermoplastic liner for use as a moisture barrier in a borehole, comprising: a hollow tubular body made from woven composite thermoplastic materials, the woven composite thermoplastic materials comprising at least two different melting points and different tensile strengths, and configured to substantially block the ingress of moisture; a gusset in at least one side of the hollow tubular body such that the hollow tubular body is able to be flattened with the respective gussets formed from folds of the hollow tubular body, such that in the flattened state the tube is more readily stored in a narrow form, but is expandable when the gusset is unfolded; wherein the woven composite thermoplastic material is comprised of a parent woven composite material and further comprises at least one laminate material on the parent woven composite material, wherein the parent material is comprised of at least two polymer components, and wherein one of the at least two polymer components is comprised of a plurality of strands in the vertical direction and the other of the at least two polymer components is comprised of a plurality of strands in the horizontal direction.

* * * * *